US008154657B2

(12) United States Patent
Wang et al.

(10) Patent No.: US 8,154,657 B2
(45) Date of Patent: Apr. 10, 2012

(54) METHOD AND RELATED DEVICE FOR DETERMINING TIMING SEQUENCE OF VIDEO AND AUDIO DATA FOR HIGH DENSITY MULTIMEDIA INTERFACE

(75) Inventors: Te-Ju Wang, Tao-Yuan Hsien (TW); Chih-Feng Juan, Taipei (TW)

(73) Assignee: Princeton Technology Corporation, Xindian Dist., New Taipei (TW)

( * ) Notice: Subject to any disclaimer, the term of this patent is extended or adjusted under 35 U.S.C. 154(b) by 1415 days.

(21) Appl. No.: 11/690,865

(22) Filed: Mar. 26, 2007

(65) Prior Publication Data

US 2008/0151116 A1   Jun. 26, 2008

(30) Foreign Application Priority Data

Dec. 20, 2006 (TW) ................................ 95147922 A

(51) Int. Cl.
*H04N 9/475* (2006.01)
(52) U.S. Cl. ............... 348/515; 348/512; 348/405.1; 348/425.4; 348/424.1; 375/240.21; 375/240.08
(58) Field of Classification Search ............. 375/240.21, 375/240.08; 348/405.1, 425.4, 424.1, 512, 348/515
See application file for complete search history.

(56) References Cited

U.S. PATENT DOCUMENTS

| 5,095,454 A | 3/1992 | Huang |
| 5,822,385 A | 10/1998 | Hayes |
| 6,223,333 B1 | 4/2001 | Kuribayashi |
| 6,239,939 B1 | 5/2001 | Bui |
| 6,429,986 B1 | 8/2002 | Blaum |
| 6,567,484 B1 | 5/2003 | Hirota |
| 6,914,637 B1* | 7/2005 | Wolf et al. ............ 348/473 |
| 7,991,096 B1* | 8/2011 | Kim et al. ............ 375/355 |
| 2002/0172315 A1 | 11/2002 | Sullivan |
| 2005/0203927 A1* | 9/2005 | Sull et al. ............ 707/100 |
| 2006/0104392 A1 | 5/2006 | Chung |
| 2006/0250939 A1 | 11/2006 | Wang |
| 2007/0292106 A1* | 12/2007 | Finkelstein et al. ......... 386/55 |
| 2008/0211963 A1* | 9/2008 | Vanderheijden et al. ..... 348/515 |

OTHER PUBLICATIONS

Dewey, M.; Johnson, D.,Applying high performance digital instrumentation for video test applications, Sep. 2008, AUTOTESTCON, 2008 IEEE, pp. 522-528.*

* cited by examiner

*Primary Examiner* — Taghi Arani
*Assistant Examiner* — Amir Mehrmanesh
(74) *Attorney, Agent, or Firm* — Winston Hsu; Scott Margo

(57) ABSTRACT

A data processing method for a high density multimedia interface (HDMI) includes receiving video and audio data, sampling the receiving data according to a sample clock, outputting a sampling pattern according to the sampled receiving data and the sample clock, comparing the sampling pattern with a plurality of predetermined patterns, deciding the timing sequence of the receiving data when the sampling pattern and one of the plurality of predetermined patterns are the same, and outputting the video and audio data according to the correct timing sequence.

20 Claims, 6 Drawing Sheets

| Pattern | Bit combination |
|---------|-----------------|
| 200 | 1101010100 |
| 202 | 0010101011 |
| 204 | 0101010100 |
| 206 | 1010101011 |

Fig. 6 Prior Art

METHOD AND RELATED DEVICE FOR DETERMINING TIMING SEQUENCE OF VIDEO AND AUDIO DATA FOR HIGH DENSITY MULTIMEDIA INTERFACE

BACKGROUND OF THE INVENTION

1. Field of the Invention

The present invention relates to a data processing method and related device for a high density multimedia interface (HDMI), and more particularly, to a method and related device for determining a timing sequence of video and audio data for HDMI according to control period patterns of serial video and audio data.

2. Description of the Prior Art

With the popularity of digital televisions, DVD display devices, and high definition flat panel displays, the time when people can really enjoy videos with high definition and high quality has finally arrived. However, the mainstream of signal transmission interfaces for flat panel displays is still based on conventional analog interfaces that have limitations of transmission distance and signal bandwidth. Furthermore, the flat panel displays have to convert the analog signals into digital signals through built-in analog-to-digital converters. In this case, not only is there a great energy loss in the signal conversion, but the transmission distance is also less than 2 to 3 meters. Therefore, in order to solve the problem, seven companies, including Intel, et al., provided a specialized signal transmission interface for digital display devices: Digital Visual Interface (DVI). DVI is utilized for transmitting video signals in digital format to display devices. Since operations such as coding, compression, and error correction can be performed on digital signals, the transmission distance can be extended to 10-20 meters, and high quality images can also be obtained. However, the size of DVI connectors is large, and audio signals cannot be transmitted through DVI, so DVI is mainly used for image data transmission between computers and display devices.

Based on DVI, a high definition multimedia interface (HDMI) is a transmission interface specifically designed for next generation multimedia video and audio devices. HDMI is suitable for digital televisions, DVD recorders and players, set-top boxes, and other multimedia electronic devices. Different from transmitting the audio and video signals separately, the most significant characteristic of HDMI is that the video and audio signals are integrated and transmitted together through HDMI. In HDMI, uncompressed digital data transmission is utilized for eliminating signal interference and attenuation effectively in conversion of digital and analog signals. Compared with DVI, not only is the size of HDMI connectors smaller, but the audio signals and the control signals for the devices can also be transmitted with the video signals. Furthermore, a high bandwidth digital content protection (HDCP) technique can be added in HDMI for preventing image data from being copied illegally.

Please refer to FIG. 1. FIG. 1 is a schematic diagram of an HDMI transmission and reception system 100. The HDMI interface utilizes a transition minimized differential signaling (TMDS) method for coding, and includes four data transmission channels, three of which (TMDS channel 0 through TMDS channel 2) are utilized for transmitting video and audio data, and the other of which is utilized for transmitting clock data. A display data channel (DDC) is utilized for reading extended display identification data (EDID) indicating display characteristics of a receiving end, such as resolution, etc. First, the transceiver 100 converts and synthesizes the video and audio data into a format the receiver 120 is capable of receiving. The transceiver 100 then encodes the video and audio data by TMDS, converts the video and audio data from parallel format to serial format, and transmits the serial data by low voltage differential signaling (LVDS). Note that the operation of the receiver 120 is the same as that of the transceiver 100, but the operation sequence is opposite.

Generally speaking, the transceiver 100 outputs respectively the ordered serial video and audio data into the TMDS channels at the same time. However, due to layout or process variation, the length, impedance, gain, and attenuation of each TMDS channel are different, such that the data transmission in each TMDS channel is delayed by a different amount. That is, the timing sequence is shifted by different amounts. In this case, the receiver 120 cannot receive the video and audio data transmitted in the TMDS channels simultaneously. Therefore, in order to enable the receiver 120 to acquire all of the desired video and audio data correctly, it is very important to determine and adjust the timing sequence of the data transmission channels. However, a method and related apparatus for determining the timing sequence of the data transmission channels is not set forth in the HDMI specification or in the prior art.

SUMMARY OF THE INVENTION

It is therefore a primary objective of the present invention to provide a data processing method for a high density multimedia interface (HDMI).

The present invention discloses a data processing method for a high density multimedia interface (HDMI) comprising: receiving video and audio data; sampling the video and audio data according to a sampling clock; outputting a sampling pattern according to the sampled video and audio data and the sampling clock; comparing the sampling pattern with a plurality of predetermined patterns; deciding a timing sequence of the video and audio data when the sampling pattern and one of the plurality of predetermined patterns are the same; and outputting the video and audio data according to the timing sequence.

The present invention further discloses a data processing device for a high density multimedia interface (HDMI) comprising: a reception unit for receiving video and audio data; a sampling unit coupled to the reception unit for sampling the video and audio data according to a sampling clock; a buffer coupled to the sampling unit for outputting a sampling pattern according to the sampled video and audio data and the sampling clock; a comparison unit coupled to the buffer for comparing the sampling pattern with a plurality of predetermined patterns; a timing sequence decision unit coupled to the comparison unit for deciding a timing sequence of the video and audio data when the sampling pattern and one of the plurality of predetermined patterns are the same according to a comparison result of the comparison unit; and an output unit coupled to the buffer and the timing sequence decision unit for outputting the video and audio data according to the timing sequence.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a schematic diagram of control period patterns transmitted by TMDS channels.

DETAILED DESCRIPTION

Figure 1:
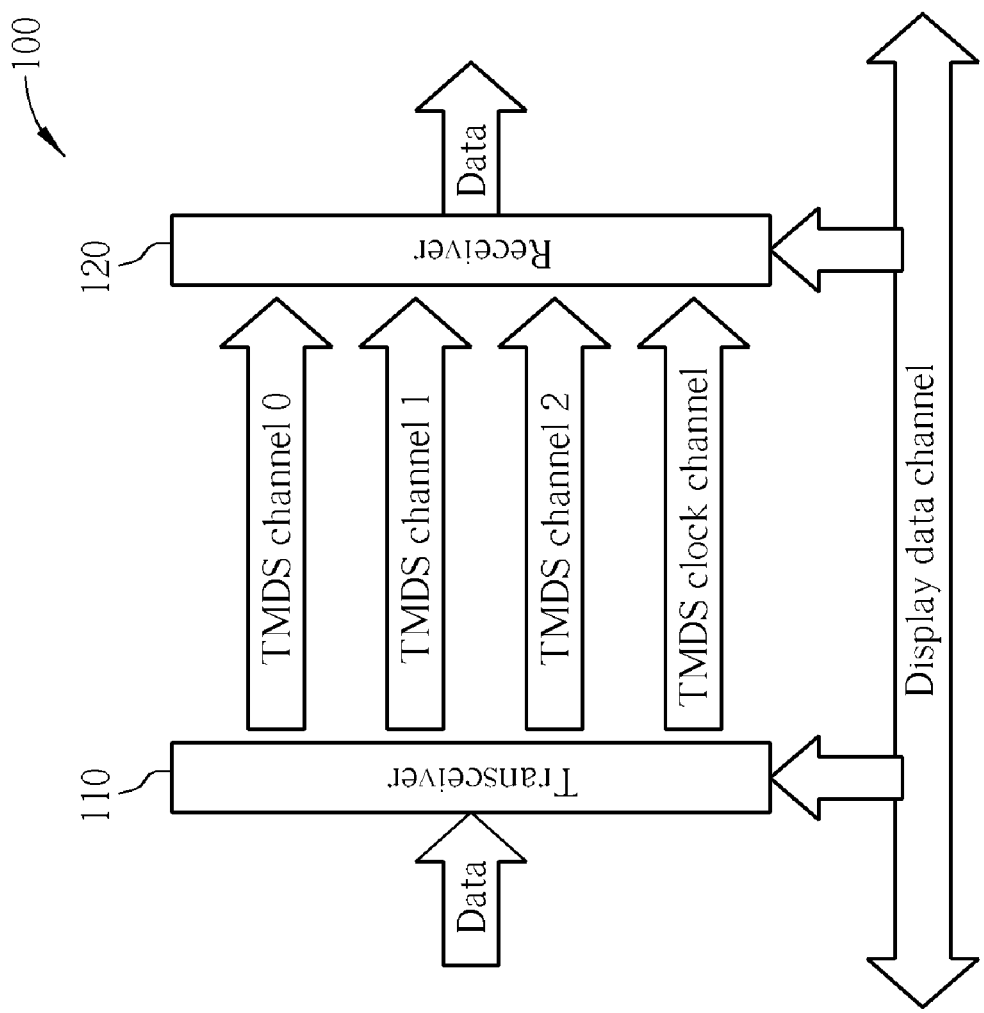
FIG. 1 is a schematic diagram of an HDMI transmission and reception system.
Figure 2:
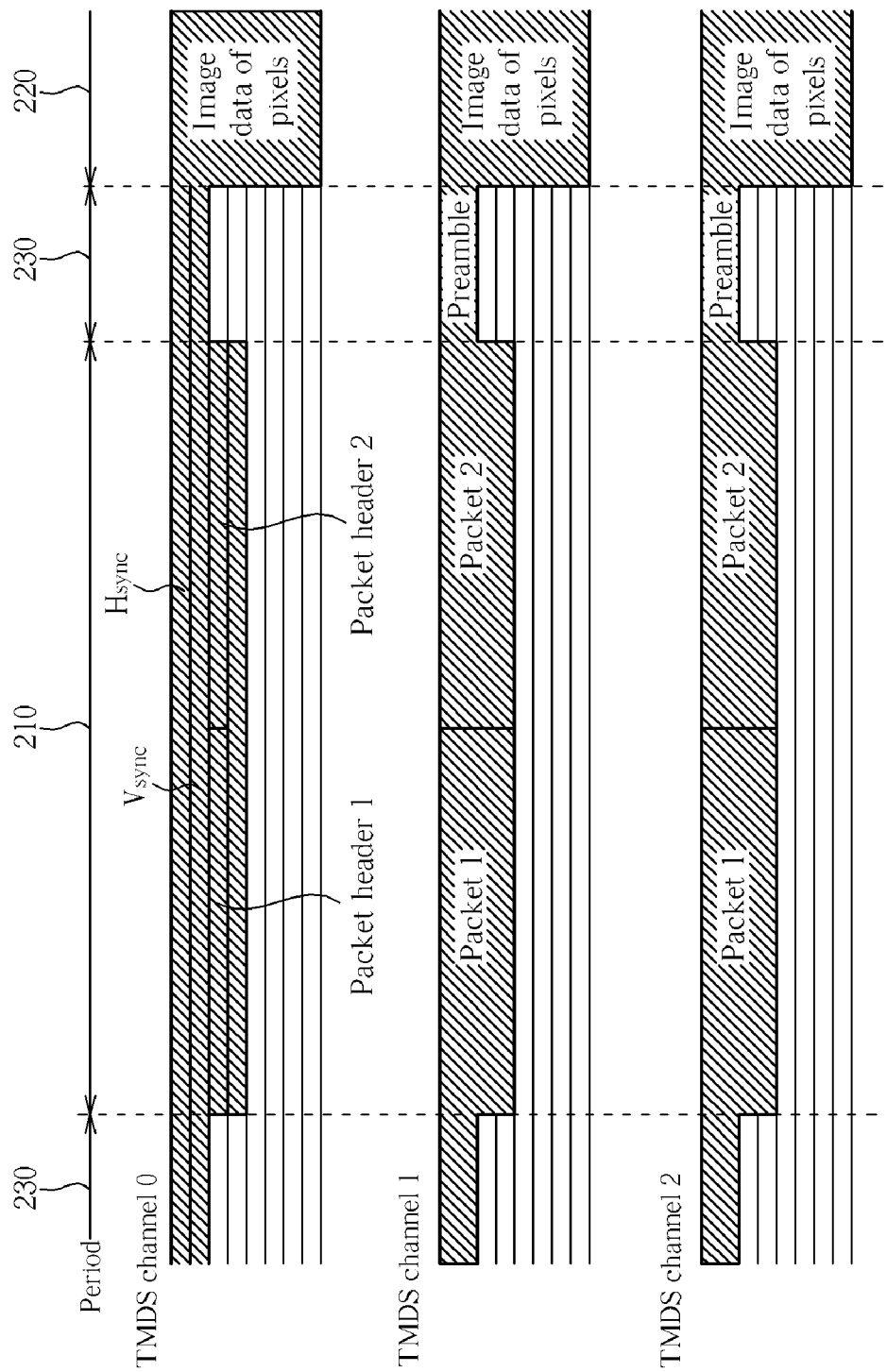
FIG. 2 is a schematic diagram of data formats transmitted by TMDS channels.

To illustrate the present invention clearly, data formats transmitted by transition minimized differential signaling (TMDS) channels are stated in the following. Please refer to FIG. 2. FIG. 2 is a schematic diagram of the data formats transmitted by the TMDS channels. As shown in FIG. 2, the data transmitted in the TMDS channels can be divided into three data periods: a data island period 210, a video data period 220, and a control period 230. The data island period 210 is utilized for transmitting audio and auxiliary signals of the video and audio data in a packet format. The video data period 220 is utilized for transmitting image data of pixels of the video and audio data. The control period 230 is utilized for transmitting preambles of the video and audio data, which indicate to a decoder whether the upcoming data period is a data island period 210 or a video data period 220. Therefore, the control period 230 always precedes the data island period 210 and the video data period 220. In other words, there must be a control period 230 between any two data periods including video and audio data. Furthermore, in the HDMI interface, each TMDS channel can transmit 8 bits of data (bit D0 through bit D7) at the same time. However, in the data island period 210, only 4 bits (bit D0 through bit D3) are utilized, while in the control period 230, only 2 bits (bit D0 and D1) are utilized. Before transmitting video and audio data, an HDMI transceiver encodes the parallel bits D0-D7 of the video and audio data into a serial format, and then transmits 10 bits of the serial data by low voltage differential signaling (LVDS) in each pixel clock. Since only 2 bits (bit D0 and D1) need to be transmitted at the same time in the control period, there are 4 different patterns generated after the serialization operation, which are shown in FIG. 6 (patterns 200, 202, 204, and 206). Therefore, the present invention can determine a timing sequence of the video and audio data according to the control period patterns of the serial video and audio data.

Figure 3:
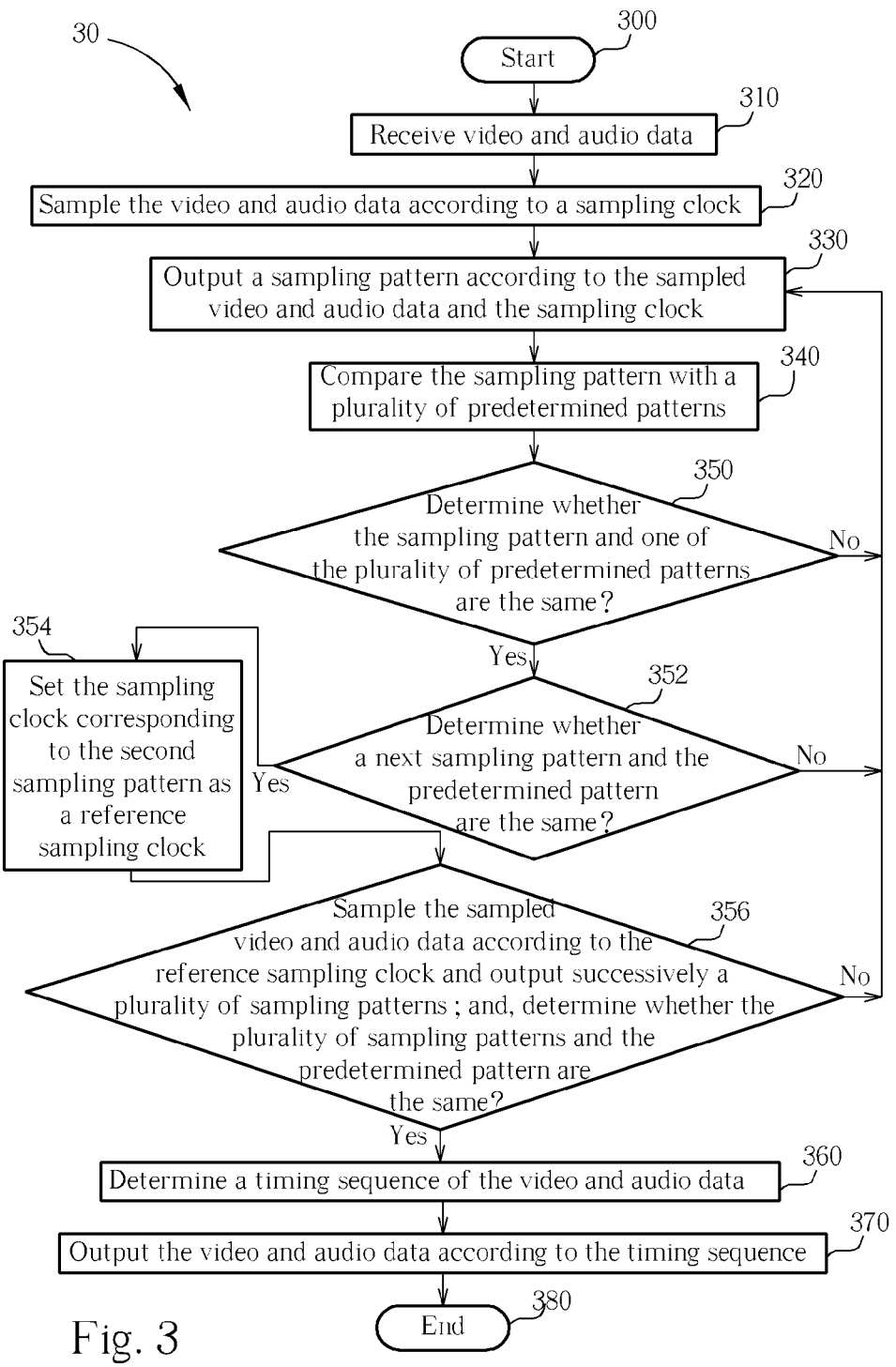
FIG. 3 is a schematic diagram of a data processing process for HDMI according to the present invention.

Please refer to FIG. 3. FIG. 3 is a schematic diagram of a data processing process 30 for a high density multimedia interface (HDMI) according to the present invention. The process 30 is utilized for determining a timing sequence of HDMI video and audio data, and comprises the following steps:

Step 300: Start.

Step 310: Receive video and audio data.

Step 320: Sample the video and audio data according to a sampling clock.

Step 330: Output a sampling pattern according to the sampled video and audio data and the sampling clock.

Step 340: Compare the sampling pattern with a plurality of predetermined patterns.

Step 350: Determine whether the sampling pattern and one of the plurality of predetermined patterns are the same; if so, proceed to Step 352; if not, return to Step 330.

Step 352: Determine whether a next sampling pattern and the predetermined pattern are the same; if three successive sampling patterns are the same as the predetermined pattern, proceed to Step 354; and if not, return to Step 330.

Step 354: Set the sampling clock corresponding to the second sampling pattern as a reference sampling clock.

Step 356: Sample the sampled video and audio data according to the reference sampling clock and output successively a plurality of sampling patterns; and, determine whether the plurality of sampling patterns and the predetermined pattern are the same; if so, proceed to Step 360; if not, return to Step 330.

Step 360: Determine a timing sequence of the video and audio data.

Step 370: Output the video and audio data according to the timing sequence.

Step 380: End.

According to the process 30, when an HDMI receiver receives the serial video and audio data transmitted by the TMDS data channels, the present invention samples the video and audio data according to a sampling clock, and outputs a sampling pattern according to the sampled video and audio data and the sampling clock. Then, the present invention determines whether the sampling pattern is the same as one of a plurality of predetermined patterns. If the sampling pattern is the same as one of the plurality of predetermined patterns, the present invention samples the sampled video and audio data according to a reference sampling clock corresponding to the sampling pattern, and outputs successively a plurality of sampling patterns. Then, the present invention determines whether the plurality of sampling patterns and the predetermined pattern are the same. If the plurality of sampling patterns is the same as the predetermined pattern, the present invention can determine the timing sequence of the video and audio data, and output the video and audio data according to the timing sequence. Conversely, if the sampling pattern is not the same as one of the plurality of predetermined patterns, or if the plurality of sampling patterns outputted successively according to the reference sampling clock is not the same as the predetermined pattern, the present invention then generates an another sampling pattern. Therefore, the present invention can determine the timing sequence of the video and audio data for following operations when the sampling pattern is the same as a predetermined pattern.

Preferably, the present invention utilizes a three-multiple over-sampling method for sampling the serial video and audio data. Therefore, a data bit can be sampled repeatedly, such that the accuracy of determining the timing sequence of the serial video and audio data can be enhanced. For example, the serial video and audio data can be over-sampled by 3 times the data transmission clock of the TMDS channels, namely 30 times the HDMI pixel clock. Therefore, the bit count of the sampled serial video and audio data is 3 times that of the original serial video and audio data. The sampled serial video and audio data is stored temporarily in a buffer, and a sampling pattern is outputted by sequentially picking a bit out of every 3 bits from the sampled serial video and audio data until 10 bits are picked (Step 330). The sampling pattern is compared with the four predetermined patterns of the control period (patterns 200, 202, 204, and 206) (Step 340). If the comparison result is the same, meaning that the sampling pattern of 10 bits is a control period signal, the correct timing sequence of the serial video and audio data can be acquired according to an initial bit position of the sampling pattern in the buffer (Step 350). Preferably, the present invention can output a second sampling pattern starting from a bit next to the initial bit position of the previous sampling pattern according to the sampled serial video and audio data in the buffer, and compare the second sampling pattern with the predetermined pattern (Step 352). Note that the predetermined pattern is obtained when the first comparison result is the same. If the three successive sampling patterns are all the same as the predetermined pattern, the sampling clock corresponding to the second sampling pattern is set to be a reference sampling clock (Step 354). According to the reference sampling clock, the sampled serial video and audio data is sampled to output successively a plurality of sampling patterns (Step 356). Then, the present invention compares the plurality of sampling patterns with the predetermined pattern repeatedly, such that the accuracy for determining the control period patterns can be enhanced. Finally, after determining the timing sequence of the serial video and audio data (Step 360), an output device can output the video and audio data with the correct timing sequence for decoding by a decoder (Step 370).

Conversely, if the sampling pattern is not the same as one of the plurality of predetermined patterns, or if the plurality of sampling patterns outputted successively according to the reference sampling clock is not the same as the predetermined pattern, a second sampling pattern is outputted by sequentially picking a bit out of every 3 bits starting from the bit next to the initial bit of the previous sampling pattern in the sampled serial video and audio data until 10 bits are picked. The present invention then compares the second sampling pattern with the four predetermined patterns of the control period. If the comparison result is the same, the process 30 proceeds to Step 352. If the comparison result is not the same, then the process 30 returns to Step 330 to output another sampling pattern again until the comparison result is the same. Since the delay time of the transmitted video and audio data is restricted to within 0.4 times the pixel clock in the HDMI specification, the outputted sampling pattern compared with the plurality of predetermined patterns can be matched in a very short time.

Figure 4:
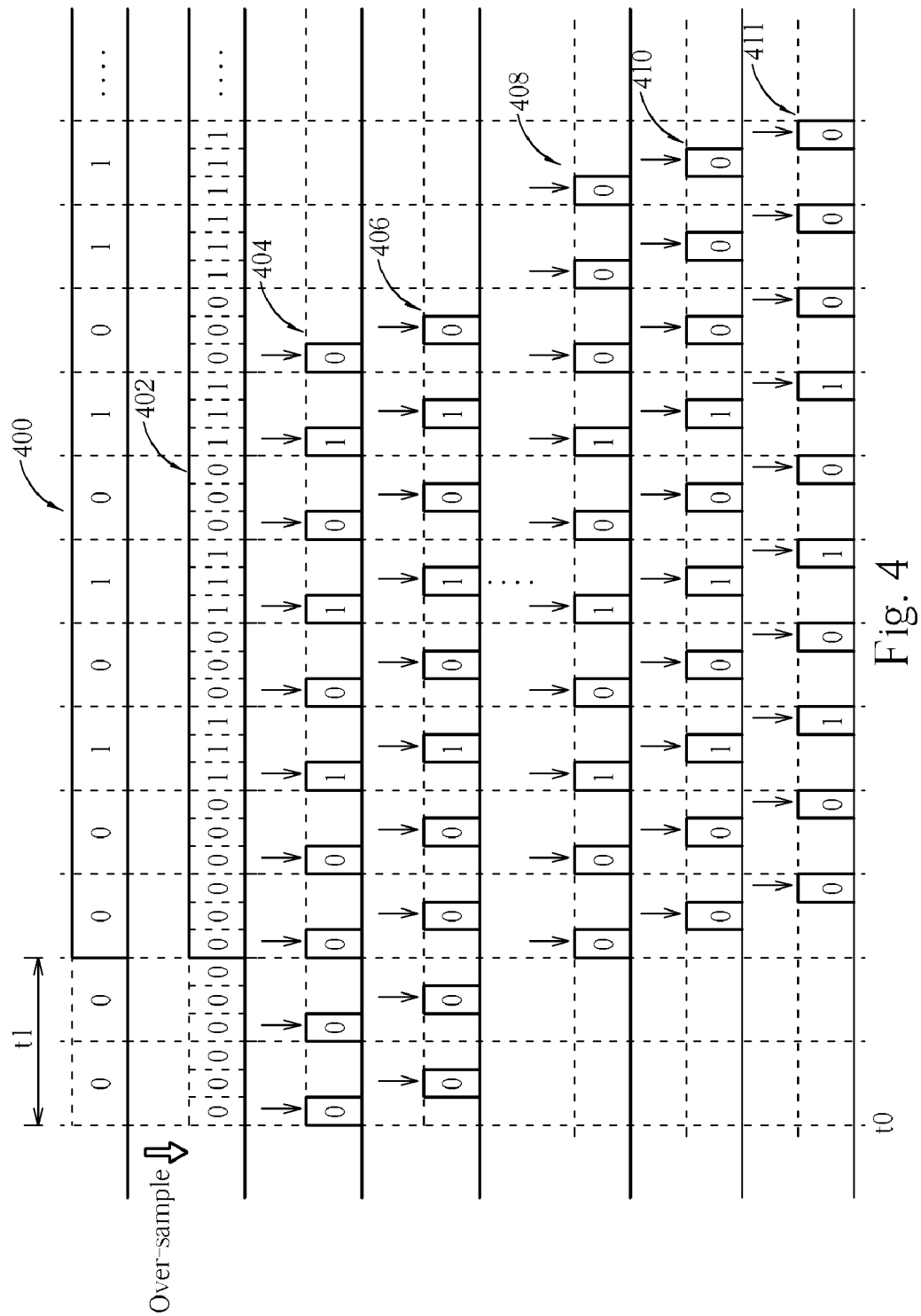
FIG. 4 is a schematic diagram of an embodiment of the process according to the present invention.

For example, please refer to FIG. 4. FIG. 4 is a schematic diagram of an embodiment of the process 30 according to the present invention. As shown in the figure, the receiver starts to receive serial video and audio data 400 at time t0. Due to different lengths and impedances of each TMDS channel, the data transmission in each TMDS channel is delayed by a different amount. In this embodiment, a delay time t1 is assumed to be 2 bits, i.e. the duration of the delay time is 0.2 times the pixel clock. Then, the serial video and audio 400 is over-sampled by a sampling clock that is 3 times the data transmission clock of TMDS channels. Therefore, the bit count of the sampled serial video and audio data 402 is 3 times that of the serial video and audio 400, and the sampled serial video and audio data 402 is temporarily stored in a buffer. Starting from a first bit of the sampled serial video and audio data 402, a sampling pattern 404 is outputted by sequentially picking a bit out of every 3 bits until 10 bits are picked. The sampling pattern 404 is then compared with the four predetermined patterns of the control period (patterns 200, 202, 204, and 206). Since the comparison result is not the same, a second sampling pattern 406 is outputted by picking sequentially a bit out of every 3 bits starting from a second bit of the sampled serial video and audio data 402 until 10 bits are picked. Then, the second sampling pattern 406 is compared with the four predetermined patterns of the control period (patterns 200, 202, 204, and 206). These steps are reiterated until the sampling pattern compared with one of the predetermined patterns is the same. In this embodiment, a sampling pattern 408 that is picked starting from the $7^{th}$ bit of the sampled serial video and audio data 402 is finally the same as the control period pattern 202. Therefore, according to the initial bit position of the sampling pattern 408 in the sampled serial video and audio data 402, the delay time of the serial video and audio data 400 can be determined to be 2 bits. Hence, according to the determination result, an output unit can adjust a timing sequence of the serial video and audio data 400, and output the correct serial video and audio data for decoding by a decoder. Preferably, sampling patterns 410 and 411 that are picked starting from $8^{th}$ and $9^{th}$ bits of the sampled serial video and audio data 402 can be outputted to be compared with the predetermined pattern 202. Since the three successive sampling patterns are all the same as the predetermined pattern 202, the sampling clock corresponding to the sampling pattern 410 is set to be a reference sampling clock. According to the reference sampling clock, the sampled serial video and audio data 402 is sampled to output a plurality of sampling patterns, and if the plurality of sampling patterns is all the same as the correct pattern 202, the timing sequence of the serial video and audio data 400 can be determined correctly. Therefore, the present invention determines the timing sequence of the video and audio data by comparing reiteratively, so as to enhance the determination accuracy. Please note that the number of the plurality of sampling patterns is not restricted to be a specific number, but depends on system efficiency and practical requirements.

Figure 5:
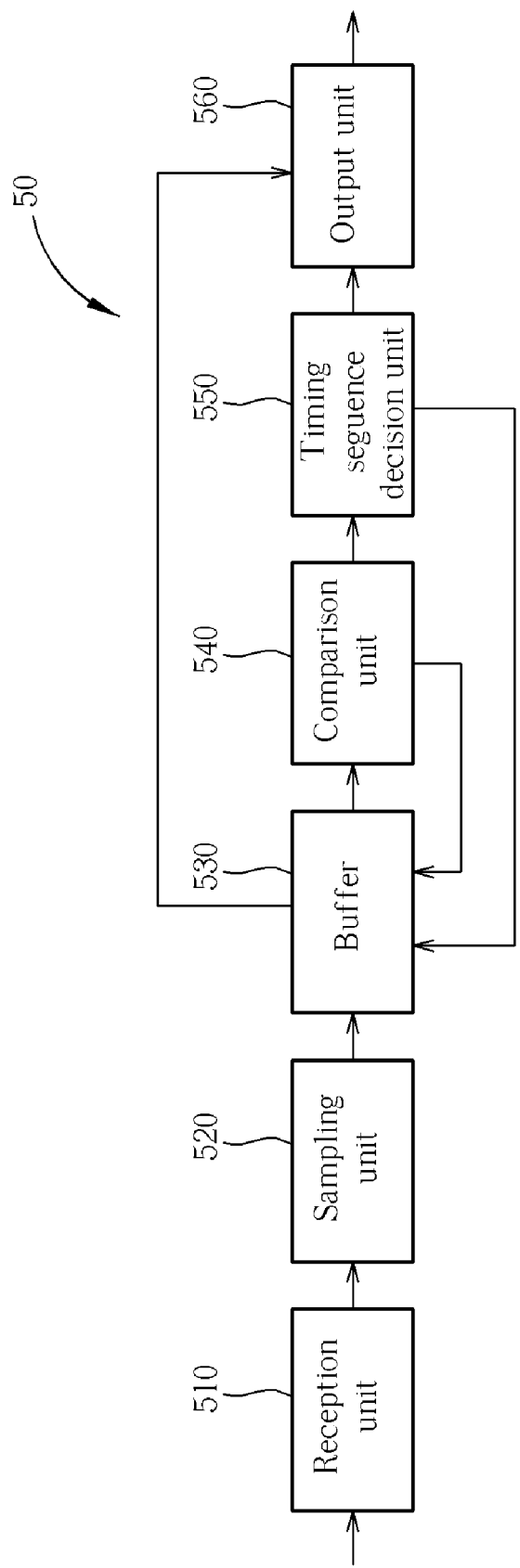
FIG. 5 is a function block diagram of a data processing device for HDMI according to the present invention.

Please refer to FIG. 5. FIG. 5 is a function block diagram of a data processing device 50 for a high density multimedia interface (HDMI) according to the present invention. The data processing device 50 is utilized for implementing the process 30, and comprises a reception unit 510, a sampling unit 520, a buffer 530, a comparison unit 540, a timing sequence decision unit 550, and an output unit 560. The reception unit 510 is utilized for receiving serial video and audio data of a TMDS channel. The sampling unit 520 coupled to the reception unit 510 is utilized for sampling the video and audio data received by the reception unit 510 according to a sampling clock. The buffer 530 coupled to the sampling unit 520 is utilized for outputting a sampling pattern according to the sampled video and audio data and the sampling clock. The comparison unit 540 coupled to the buffer 530 is utilized for comparing the sampling pattern with a plurality of predetermined patterns. The timing sequence decision unit 550 coupled to the comparison unit 540 is utilized for deciding a timing sequence of the video and audio data when the sampling pattern and one of the plurality of predetermined patterns are the same according to a comparison result of the comparison unit 540. The output unit 560 coupled to the buffer 530 and the timing sequence decision unit 550 is utilized for outputting the video and audio data according to the timing sequence.

In the present invention, the sampling unit 520 preferably utilizes an over-sampling method for sampling the serial video and audio data. Therefore, a data bit can be sampled reiteratively, such that the accuracy of determining the timing sequence of the serial video and audio data can be enhanced. For example, the serial video and audio data can be over-sampled by 3 times the data transmission clock rate of the TMDS channels, i.e. 30 times the HDMI pixel clock. Therefore, the bit count of the sampled serial video and audio data is 3 times of that of the original serial video and audio data. The sampled serial video and audio data is stored temporally in the buffer 530. The buffer 530 outputs a sampling pattern according to a bit sequence of the sampled video and audio data and the sampling clock. Since the sampling clock is 3 times the data transmission clock of the TMDS channels, the buffer 530 outputs a sampling pattern to the comparison unit 540 by sequentially picking a bit out of every 3 bits from the sampled serial video and audio data until 10 bits are picked. The comparison unit 540 is utilized for comparing the sampling pattern with the four control period patterns. If the comparison result is the same, the comparison result is outputted to the timing sequence decision unit 550; but, if the comparison result is not the same, another sampling pattern is outputted by starting from the bit next to the initial bit of the previous sampling pattern in the buffer 530, and compared with the four control period patterns. These steps are performed reiteratively until the comparison result is the same. The timing sequence decision unit 550 determines the timing sequence of the video and audio data according to the initial bit position of the sampling pattern, which is the same as one of the control period patterns, in the buffer 530. Therefore, the output unit 560 can adjust the timing sequence of the video and audio data, and output the correct serial video and audio data for decoding by a decoder. Furthermore, when the same compassion result is outputted from the comparison unit 540 to the timing sequence decision unit 550, the buffer 530 can preferably output a plurality of sampling patterns by sampling the sampled video and audio data according to a reference sampling clock corresponding to the sampling pattern. Then, the plurality of sampling patterns is compared with the predetermined pattern by the comparison unit 540. By comparing reiteratively, the determination accuracy of the control period patterns can be enhanced, so that the timing sequence of the video and audio data can be determined by the timing sequence decision unit 540.

As mentioned above, the present invention provides a method of determining a timing sequence and related apparatus for HDMI. The timing sequence of the video and audio data can be determined by utilizing the control period patterns of the serial video and audio data in TMDS channels, so that the decoder of the display device can correctly return the desired video and audio data from the plurality of the video and audio data transmission channels. Furthermore, convenience in circuit design can also be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data processing method for a high density multimedia interface (HDMI) receiver comprising:
   receiving video and audio data; sampling the video and audio data according to a sampling clock;
   outputting a sampling pattern according to the sampled video and audio data and the sampling clock; comparing the sampling pattern with a plurality of predetermined patterns;
   deciding a timing sequence of the video and audio data when the sampling pattern and one of the plurality of predetermined patterns are the same;
   outputting a second sampling pattern according to the sampled video and audio
   data and the sampling clock when the sampling pattern and one of the plurality of predetermined patterns are not the same;
   comparing the second sampling pattern and a plurality of predetermined patterns; deciding a timing sequence of the video and audio data when the second sampling pattern and one of the plurality of predetermined patterns are the same; and
   outputting the video and audio data according to the timing sequence.

2. The data processing method of claim 1, wherein the video and audio data is serial video and audio data transmitted by transition minimized differential signaling (TMDS).

3. The data processing method of claim 1, wherein the sampling clock is a multiple of a pixel clock of the HDMI.

4. The data processing method of claim 3, wherein the multiple is 30 times.

5. The data processing method of claim 1, wherein the sampling pattern comprises 10 bits.

6. The data processing method of claim 1, wherein outputting the sampling pattern according to the sampled video and audio data and the sampling clock is outputting the sampling pattern according to a bit sequence of the sampled video and audio data and the sampling clock.

7. The data processing method of claim 1, wherein deciding the timing sequence of the video and audio data when the sampling pattern and the predetermined pattern are the same comprises:
   sampling the sampled video and audio data according to a reference sampling clock corresponding to the sampling pattern and outputting a plurality of sampling patterns; and
   comparing the plurality of sampling patterns with the predetermined pattern to decide the timing sequence of the video and audio data.

8. The data processing method of claim 1, wherein the plurality of the predetermined patterns correspond to a plurality of control period patterns of an HDMI data format.

9. The data processing method of claim 8, wherein each of the plurality of predetermined patterns comprises 10 bits.

10. The data processing method of claim 8, wherein the plurality of predetermined patterns comprises 4 patterns.

11. A data processing device for a high density multimedia interface (HDMI) receiver comprising:
   a reception unit comprising a first processor for executing a first program code
   and a first memory storing the first program code, wherein the first program code comprises receiving video and audio data;
   a sampling unit coupled to the reception unit, comprising a second processor for executing a second program code and a second memory storing the second program code, wherein the second program code comprises sampling the video and audio data according to a sampling clock;
   a buffer coupled to the sampling unit for outputting a sampling pattern according to the sampled video and audio data and the sampling clock;
   a comparison unit coupled to the buffer, comprising a third processor for executing a third program code and a third memory storing the third program code, wherein the third program code comprises comparing the sampling pattern with a plurality of predetermined patterns;
   a timing sequence decision unit coupled to the comparison unit, comprising a fourth processor for executing a fourth program code and a fourth memory storing the fourth program code, wherein the fourth program code comprises deciding a timing sequence of the video and audio data when the sampling pattern and one of the plurality of predetermined patterns are the same according to a comparison result of the comparison unit;
   wherein the buffer outputs a second sampling pattern according to the sampled video and audio data and the sampling clock when the sampling pattern and one of the plurality of predetermined patterns are not the same, the third program code further comprises comparing the second sampling pattern and a plurality of predetermined patters;
   the fourth program further comprises deciding a timing sequence of the video and audio data when the second sampling pattern and one of the plurality of predetermined patterns are the same; and an output unit coupled to the buffer and the timing sequence decision unit, comprising a fifth processor for executing a fifth program code and a fifth memory storing the fifth program code, wherein the fifth program code comprises outputting the video and audio data according to the timing sequence.

12. The data processing device of claim 11, wherein the video and audio data is serial video and audio data transmitted by transition minimized differential signaling (TMDS).

13. The data processing device of claim 11, wherein the sampling clock is a multiple of a pixel clock of the HDMI.

14. The data processing device of claim 11, wherein the multiple is 30 times.

15. The data processing device of claim 11, wherein the sampling pattern comprises 10 bits.

16. The data processing device of claim 11, wherein the buffer is utilized for outputting the sampling pattern according to a bit sequence of the sampled video and audio data and the sampling clock.

17. The data processing device of claim 11, wherein the buffer samples the sampled video and audio data according to a reference sampling clock corresponding to the sampling pattern and outputs a plurality of sampling patterns when the sampling pattern and the predetermined pattern are the same, and the comparison unit is utilized for comparing the plurality of sampling patterns with the predetermined pattern for the timing sequence decision unit to decide the timing sequence of the video and audio data.

18. The data processing device of claim 11, wherein the plurality of predetermined patterns correspond to a plurality of control period patterns consistent with an HDMI data format.

19. The data processing device of claim 11, wherein each of the plurality of predetermined patterns comprises 10 bits.

20. The data processing device of claim 11, wherein the plurality of predetermined patterns comprises 4 patterns.

\* \* \* \* \*